Patented July 25, 1939

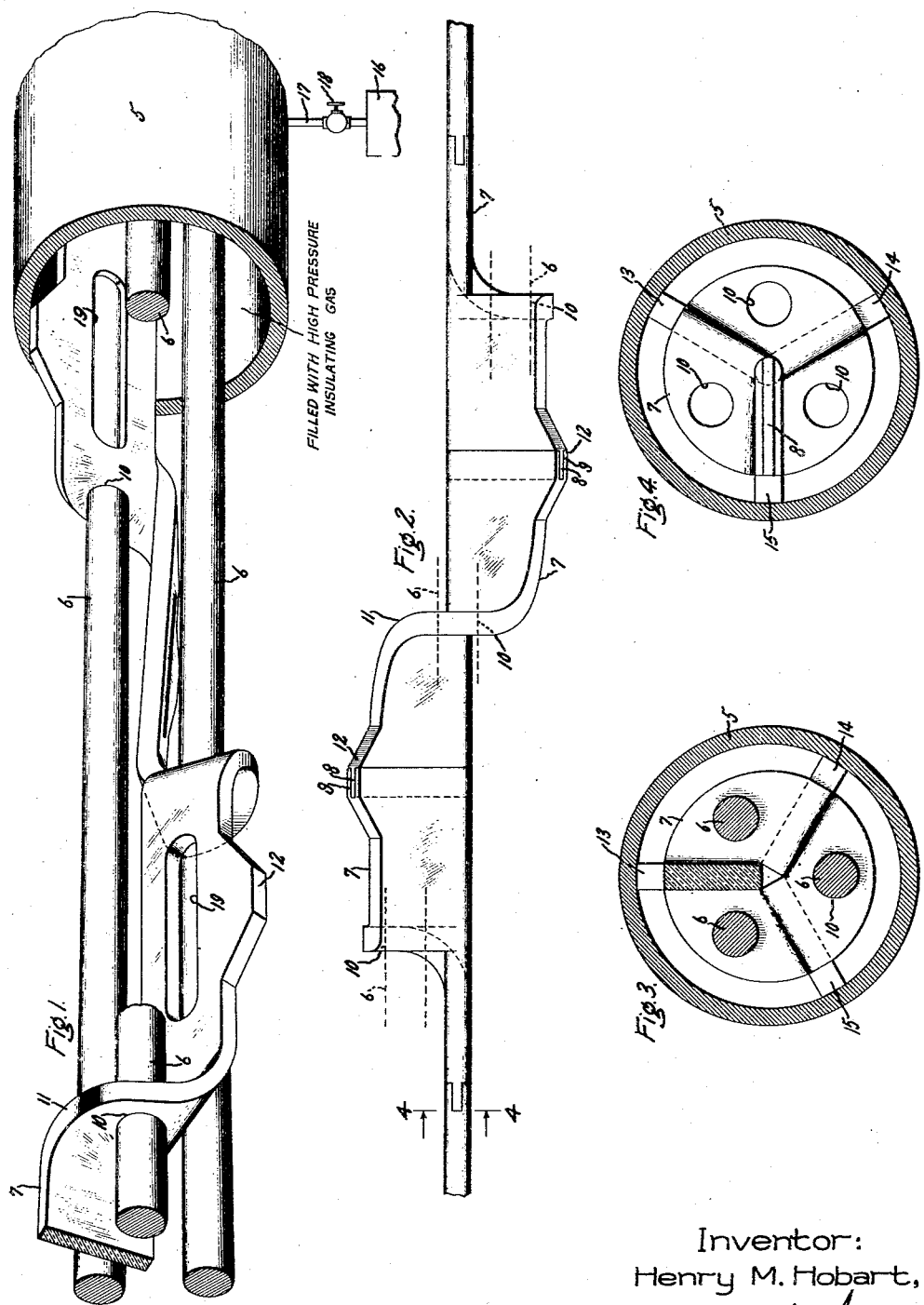

2,167,510

UNITED STATES PATENT OFFICE 2,167,510

HIGH TENSION GAS INSULATED CABLE

Henry M. Hobart, Niskayuna, N. Y., assignor to General Electric Company, a corporation of New York Application November 26, 1937, Serial No. 176,461

6 Claims. (Cl. 174—27)

The present invention relates to cables for transmitting high potential electric current of the type comprising an impervious enclosure such as a metal pipe, for example, within which the conductors are located and suitably supported by nonconducting supports, the enclosure being filled with nonconducting gas under relatively high pressure. The problem presented in cables of this type is that of providing nonconducting supports for the conductors which in addition to maintaining the conductors in proper spaced relation to the wall of the metallic enclosure also prevent the passage of current from the conductors to the metallic enclosure as well as between the conductors which operate at different potentials. A further problem is that of providing supports of such character that they are of reasonable cost as compared to the cost of the cable as a whole.

The object of my invention is the provision of an improved cable of the above-mentioned gas insulated type in which the conductors are adequately supported by insulators of reasonable cost which effectively prevent the passage of current from the conductors to the metallic enclosure and also from conductor to conductor.

For a consideration of what I believe to be novel and my invention, attention is directed to the accompanying description and the claims appended thereto.

In the accompanying drawing is illustrated an embodiment of my invention in which Fig. 1 is a perspective view of a gas insulated three-conductor cable; Fig. 2 is a plan view of an insulator; Fig. 3 is a cross-section of the cable, and Fig. 4 is an end view of the insulator looking in the direction of the arrows 4—4 of Fig. 2.

5 indicates a pipe or enclosure which desirably may be made of steel or other metal. In the operation of the cable, the pipe is filled with insulating gas under a determined high pressure. The pressure ordinarily would vary somewhat with the potential to which the conductors are subjected. Usually, the pressure will be of the order of several hundred pounds per square inch. The dielectric stress, to which such gas is subjected in service, desirably may be of the order of hundreds of volts per mil of unit thickness. On the contrary, with solid insulation, heating and losses occur when it is subjected to alternating current voltage stresses, and if the stresses in terms of volts per mil are great, there results a gradual deterioration with ultimate failure. For the latter reason, the length of the path through the solid insulation between conducting parts should be relatively great.

6 indicates relatively rigid conductors which may be solid or stranded as preferred and form a part of a multiphase system of distribution. Since solid conductors have a greater current carrying capacity for a given diameter due to the absence of strand spaces with little tendency to sag, it will generally be desirable to use solid conductors if the eddy current losses and the losses due to the "proximity effect" are not too great. The amount of such losses varies with the size of the conductors, the spacing from one another, the voltage and current transmitted, the periodicity, and the material of the conductor. In the present illustration, three conductors are shown spaced 120° apart but the invention is not necessarily limited thereto. The conductors are bare or at least they have no covering which is sufficient to insulate them under the high voltage of the current being transmitted thereby.

The conductors are maintained in their respective positions within the pipe by a series of individual insulators 7 made of glass or other suitable equivalent material. For the purpose of reducing the cost, they are desirably made by a casting process. Each insulator may be made up of a unitary length capable of supporting three conductors between its ends as shown in Fig. 1, or of shorter pieces or units as shown in Fig. 2, each designed to receive and support at least one conductor. When relatively short pieces or units are employed, it is desirable to provide the meeting ends of each pair with a tongue 8 and groove 9 to form a connection therebetween as shown in Fig. 2 so as to prevent one unit from turning on its axis with respect to the others.

Considering first the unitary structure of Fig. 1, this may, for example, be of the order of six feet in length and because each insulator supports all of the conductors, there is no tendency for one to turn with respect to the others, and therefore the tongue and groove feature of the smaller units of Fig. 2 may be omitted. Generally, but not necessarily, the adjacent ends of two such insulators will abut but no harm will be done if they are spaced apart, provided there is no material sagging of the conductors in the space between them. Each insulator, as previously indicated, may advantageously be made of preformed glass, as by casting. As shown, there are three axially spaced openings 10 in 120° relation, each containing a conductor 6, the remainder of the insulators being similarly provided with openings in sets of three. Because the insulator is relatively hard and unyielding, the openings 10 should be somewhat larger than the conductors so as not to offer any obstruction in the assembly operation. Briefly stated, the insulator is in the form of a twisted strip of flat stock with offsets 11 at determined intervals between the flat surfaced radially positioned portions, each offset having at least one conductor opening 10. Between each two offset portions, there are integral projections 12 which loosely engage the inner wall of the pipe 5 and serve to center the insulator and the conductors within it. It is important to have the pipe engaging projections 12 as widely separated from the parts of the insulator through which the conductors pass as possible so as to decrease the dielectric stress and the losses in the solid body. It is also desirable to make the surface of the projection where it engages the inner wall of the pipe small since by so doing the effective length of the insulator between conducting parts is correspondingly increased. This is well illustrated in Fig. 2 where the projections are located midway between the regions where the conductors, shown in dotted lines, pass through the openings 10. Considering the structure from another point of view, there are three radially extending web portions 13, 14 and 15, Fig. 3, each having flat side faces and occupying radial positions spaced 120° apart, the web portions being axially displaced by a substantial distance, with each two radial web portions connected by an offset portion 11. As will be seen, the portions 13, 14 and 15 extend axially for a considerable distance and it will also be seen that they occupy positions radial to the axis of the pipe and that each two such portions are connected by an offset portion and that it is through the offset portions that the conductors extend. In this connection, it is to be understood that solid material after use in an alternating current cable is not as effective an insulator as the high pressure gas with which the pipe 5 is filled under a suitably high sustained pressure. This is due to the fact that internal heating gradually ages the insulation and thereby causes its effectiveness as an insulating medium to be seriously impaired because of corona losses which take place in the minute voids within the body. For the purpose of filling and maintaining the gas under pressure, any suitable available means may be employed, such as compressors, gas filled pressure tanks, etc. Desirably, the gas should be free of dirt, moisture and other impurities which would tend to weaken it as a dielectric. 16 indicates a tank for supplying high pressure gas to the pipe 5 through a conduit 17 subject to the control of an automatic pressure reducing or other valve 18. The solid insulating material should only be subject to dielectric stresses of a low order, say, for example, fifty volts per mil of thickness whereas the highly compressed insulating gas may be subjected to hundreds of volts per mil, and for that reason the length of the solid insulation interposed between two points of different potential should be as long as possible consistent with other features of the construction. As a result of the construction described, the solid insulator will be free from deterioration due to heating and losses incident to alternating current voltages.

The structure illustrated in Fig. 2 is essentially the same as that shown in Fig. 1, except that it is made of smaller units for simplicity of manufacture and assembly. Such a construction requires, however, some means for uniting the units of which the tongue and groove is an example. Such an arrangement serves to prevent the units from turning or twisting out of their 120° relation when assembled on the conductors. In order to reduce the amount of solid insulation and also to save weight the parts may be cored as indicated at 19 in Fig. 1.

In installing the cable, the pipes 5 will be in comparatively short lengths and later the lengths will be united by welding. The insulators will be threaded on the conductors and the parts so assembled pulled or pushed into the pipe lengths. The ends of the corresponding lengths of conductors will be united or spliced before the welding of the pipe lengths. The lengths of the conductors prior to splicing may correspond to the pipe lengths or the conductor length may be equal to two or more pipe lengths in which case the pipe lengths will first be welded and later the conductors spliced between the pipe lengths. The splicing operation will be facilitated by temporarily permitting the ends of the conductors in one pipe to project somewhat beyond its open end.

The particular gas employed is not material, provided it has good insulating properties and is free of foreign matter such as dirt and moisture and provided further that it will not corrode or otherwise attack the materials with which it is in contact. A single gas may be employed or a mixture of gases of which there are a number available for the purpose.

What I claim as new and desire to secure by Letters Patent of the United States is:

1. A cable comprising a metal pipe, longitudinally extending high tension conductors located therein in spaced angular relation, a series of solid insulators arranged in end to end relation within the pipe, each insulator having relatively long axially displaced web portions occupying different radial positions with respect to each other, axially spaced projections of small surface area on the web portions engaging the inner wall of the pipe, offset portions uniting the radially disposed web portions and also supporting the conductors, and a filling of highly compressed insulating gas for the pipe, the gas having a greater dielectric strength per mil of thickness than the solid insulators.

2. A cable comprising a metal pipe, longitudinally extending high tension conductors located therein, a series of solid insulators arranged in end to end relation within the pipe, each insulator having axially displaced radially disposed web portions, spaced projections on the web portions of small surface area engaging the inner wall of the pipe for centering the insulator, offset portions connecting each two web portions, each having an opening through which a conductor extends, the wall of the opening retaining the conductor against displacement, and a filling of highly compressed insulating gas for the pipe.

3. A multi-phase cable comprising a metal pipe, uninsulated longitudinally extending high potential rigid conductors located therein in 120° spaced relation, individual solid insulating supports within the pipe, each of which is common to all of the conductors, the support having radially extending flat sided web portions in 120° relation, integral offset portions connecting adjacent ends of the radial web portions, the offset portions being in spaced axial relation and angularly displaced with respect to each other, each offset having a means for supporting a conductor in spaced angular relation to the other conductors, and a filling of insulating fluid under pressure for the pipe, the pressure being such that its dielectric strength is greater per unit of thickness than that of the solid insulators.

4. A cable comprising an impervious metal pipe, longitudinally extending uninsulated high potential conductors located therein, a solid insulating support for the conductors located within the pipe and comprising a series of preformed units arranged end to end, each unit having axially extending flat sided radially disposed web portions having projections therein of small surface for engagement with the inner wall of the pipe and supported thereby, offset portions connecting the radial web portions, openings located in the offset portions of each unit for supporting the conductors in spaced relation, and a filling of high pressure insulating fluid for the pipe, the dielectric strength of which per mil is greater than that of the solid insulators.

5. A cable comprising an impervious metal pipe, longitudinally extending uninsulated high potential conductors located therein, a solid insulating support for the conductors located within the pipe and comprising a series of cast units arranged end to end, each unit having axially extending radially disposed portions of small surface area for engagement with the inner wall of the pipe and supported thereby, offset portions connecting the radial portions, interengaging means at the adjacent ends of pairs of units, means located at the offset portions of each of the units for supporting the conductors, and a filling of high pressure insulating fluid for the pipe.

6. A high potential cable comprising a sealed metal pipe, uninsulated high potential conductors extending axially thereof, a series of solid insulators therefor arranged in endwise relation, each being in the form of a strip of flat material having relatively small surfaced radial portions engaging the wall of the metal pipe at widely spaced points in an axial direction so as to afford relatively long creepage surfaces for current from the conductors to the metal pipe, the solid insulators having relatively low dielectric strength per mil, offsets between each two radial portions for uniting them and having openings therein through which the conductors extend and are held against movement by the walls thereof, and a filling of insulating gas for the pipe under such relatively high pressure that it has many times greater dielectric strength per mil than the solid insulation.

HENRY M. HOBART.